(12) United States Patent
Ogura

(10) Patent No.: US 7,321,770 B2
(45) Date of Patent: Jan. 22, 2008

(54) COMMUNICATION TERMINAL APPARATUS AND PROGRAM FOR PROCESSING COMMUNICATION INFORMATION

(75) Inventor: Kazuo Ogura, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 174 days.

(21) Appl. No.: 10/925,807

(22) Filed: Aug. 25, 2004

(65) Prior Publication Data

US 2005/0054373 A1    Mar. 10, 2005

(30) Foreign Application Priority Data

Aug. 29, 2003  (JP)  ............................. 2003-306096
Sep. 5, 2003   (JP)  ............................. 2003-313673
Sep. 5, 2003   (JP)  ............................. 2003-313674

(51) Int. Cl.
*H04Q 7/20*    (2006.01)
*G06F 15/16*   (2006.01)
*G06F 12/00*   (2006.01)

(52) U.S. Cl. ..................... 455/434; 709/201; 707/205

(58) Field of Classification Search ............ 455/412.1, 455/559, 556.1, 434; 711/162, 114, 147; 709/201; 707/1, 7, 200, 204, 205; 705/14; 358/1.15

See application file for complete search history.

(56) References Cited

U.S. PATENT DOCUMENTS 6,691,149 B1*  2/2004  Yokota et al. .............. 709/201
6,708,189 B1*  3/2004  Fitzsimons et al. ......... 707/205
2002/0072926 A1*  6/2002  Morita et al. .................. 705/1
2003/0035141 A1*  2/2003  Ilda ........................... 358/1.15
2004/0063459 A1*  4/2004  Yamashita et al. ....... 455/556.1
2004/0152489 A1*  8/2004  Kikuchi et al. ............. 455/559
2004/0172509 A1*  9/2004  Takeda et al. .............. 711/162
2004/0192260 A1*  9/2004  Sugimoto et al. ........ 455/412.1

FOREIGN PATENT DOCUMENTS

JP    2002-359694 A    12/2002

* cited by examiner

*Primary Examiner*—Joseph Feild
*Assistant Examiner*—Kiet Doan
(74) *Attorney, Agent, or Firm*—Frishauf, Holtz, Goodman & Chick, P.C.

(57) ABSTRACT

A control unit 13 gives to input data a real file name for uniquely identifying the input data and stores the input data in a memory card 7, and further stores in the memory card 7 a management file representing a relationship between the real file name and a title, both given to the same data. The title is entered through a key input unit 5 and given to the input data. The memory card 7 has plural directories assigned respectively to data sorts of input data. The data input from an external apparatus are automatically stored respectively in the corresponding directories depending on their data sorts. An extension representing a data sort is removed from the title which can be managed by a user and is given to the data previously stored in the memory card 7. Management information is created and stored in the memory card 7, which information represents relationship between the real file name and the title with the extension removed, both being given to each of the data stored in the memory card 7.

6 Claims, 14 Drawing Sheets

FIG. 8A

ROOT DIRECTORY
    └── DATAFILE.MGR ··· TITLE MANAGEMENT FILE
    └── ph_ab000.png
    └── mv_ab001.amc
    └── aaaa0000.jpg

FIG. 8B

| REAL FILE NAME | TITLE |
|---|---|
| ph_ab000.png | summer holidays |
| mv_ab001.amc | athletic meeting |
| aaaa0000.jpg | photo of POCHI |

*POCHI: DOG'S NAME

FIG. 10A

| REAL FILE NAME | TITLE |
|---|---|
| mv_ab001.amc | athletic meeting |
| aaaa0000.jpg | photo of POCHI |

FIG. 10B

| REAL FILE NAME | TITLE |
|---|---|
| ph_ab000.png | summer holidays.png |
| mv_ab001.amc | athletic meeting |
| aaaa0000.jpg | photo of POCHI |

FIG. 10C

| REAL FILE NAME | TITLE |
|---|---|
| ph_ab000.png | summer holidays |
| mv_ab001.amc | athletic meeting |
| aaaa0000.jpg | photo of POCHI |

COMMUNICATION TERMINAL APPARATUS AND PROGRAM FOR PROCESSING COMMUNICATION INFORMATION

BACKGROUND OF THE INVENTION

1. Field of the Invention

The present invention relates to a communication terminal apparatus and a program for processing communication information, and more particularly to a communication terminal apparatus connected with an external apparatus such as a personal computer to send data to the external apparatus or receive data from the same, and to a program for processing communication information.

2. Description of the Related Art

In recent years, concerning a function of communication terminal apparatus such as a cellular phone, various proposals have been made for transmitting various sorts of data to an external apparatus such as a personal computer and/or receiving the data from the same.

For example, Japanese laid-open patent specification 2002-359694 discloses an easy-to-use data-storing system of high reliability, in which a cellular phone which is compact in size, easy-to-carry, and impervious to vibration and is widely used is used as a storage for a personal computer.

In the data storing system, when the cellular phone is connected to a personal computer through a USB cable or a serial cable, a control section in the cellular phone judges based on a signal sent from the personal computer, which of a data storing mode, a data transmission mode, and a communication mode has been set.

When the data storing mode has been set, the cellular phone receives data stored in a memory of the personal computer through the USB cable, the serial cable or the internet, and stores the received data in its internal memory or an external memory, in accordance with a user's instruction sent from the personal computer or the cellular phone.

When the data transmission mode has been set, the cellular phone transmits data stored in its internal memory or the external memory through the USB cable, the serial cable or the internet, and stores the transmitted data in the memory of the personal computer, in accordance with the user's instruction sent from the personal computer or the cellular phone.

When the communication mode has been set, the cellular phone transmits data stored in its internal memory or the external memory as an e-mail. As described above, the cellular phone connected to the personal computer works as the storage. In the cellular phone, a built-in EEPROM is used as the internal memory, and as the external memory is used a storing medium (such as a card type memory) which is detachable to the cellular phone.

However, the conventional technology has a drawback that contents of data exchanged between the cellular phone and the personal computer are not known until the data is displayed. In the conventional technology, a file name of the data can be managed by the user at the side of the personal computer, but a real file name is not automatically given to the input data depending on data sort at the cellular phone and can not be managed by the user at the side of the cellular phone.

When an image photographed by using the cellular phone with a camera function is transferred to the personal computer, the user have to memorize a real file name of image data upon displaying the image on a display of the cellular phone and have to designate the memorized real file name on the personal computer. Since the real file name is such as "ph_ab000.npg" or "mv_ab001.amc", the user is required to do troublesome work to memorize the real file name and can make an error in memorizing such real file name. Therefore, data transferring process using the real file name burdens the user with complex and hard manipuration.

The conventional technology further has a drawback that data file to be exchanged between the cellular phone and the personal computer can not be classified and managed based on the data sort, because the data has no identification information for identifying the data.

For example, when data of different sorts, such as moving image data, music data, text data are transferred from the personal computer to the cellular phone, the personal computer can not control the cellular phone so as to classify the transferred data in terms of data sorts and store the classified data into corresponding memory areas of the cellular phone. On the contrary, when different sorts of data concerning the same theme are transferred, the personal computer can not control the cellular phone so as to store all the transferred data in a common memory area of the cellular phone.

Further, the conventional technology has another drawback that identification information of files for identifying data exchanged between the cellular phone and the personal computer are not compatible with each other. The user can manage the file name of data on the personal computer, but the cellular phone automatically gives input data a real file name based on the data sort, and therefore the user is not allowed to manage the real file name.

Further, when data under control of the personal computer is transferred to the cellular phone, an extension representing data sort is automatically included in the title of the data. For example, extensions such as ".png", and ".jpg" are included in the title of data such as "Summer holidays.png", and "Garden.jpg". In general, the extension is meaning less and is not smart. But when a title is given in English, there is a risk that such title can invite misunderstanding that the extensions included in the titles such as "Summer holidays.png", and "Garden.jpg" seem to have some meaning.

SUMMARY OF THE INVENTION

The present invention has an object of providing an easy data process for processing data having a real file name which is out of a user's management, in which data process a title that can be managed by a user is given to the data, and the data is easily processed by using such given title. Further, the present invention has an object of providing an easy data transmission requiring no complex procedure in a communication terminal apparatus connected to an external apparatus, in which data transmission, when data file is transmitted from the communication terminal apparatus to the external apparatus, the user is allowed to manage the title of the data file in the communication terminal apparatus for transmitting the data file.

According to one aspect of the invention, it features that a first identification information is given to input data to identify the same and stored in a predetermined memory, and that a second identification information to be given to the data stored in the memory is entered in response to operation by a user, and that management information is created and stored in the memory, which information represents relationship between the first identification information and the second identification information, both given to the same data.

With the arrangement of the present invention, the user can easily process data having a real file name that is out of the user's management, by giving to the data a title which the user can manage. Further, the arrangement has another advantage that, when a data file is transferred from the communication terminal apparatus to the external apparatus, data can be transmitted in a simple manner without complicated procedure, by previously giving the data a file name which the user can manage at the side of the communication terminal apparatus.

Further, the present invention has an object of providing a data management in which, when different sorts of data are input from the external apparatus, the input data are automatically classified in terms of data sorts and stored in corresponding memory areas of the communication terminal apparatus. The present invention has another object of providing a data management in which, when different sorts of data are input from the external apparatus, all the input data are stored in a common memory area in the communication terminal apparatus regardless of data sorts.

According to another aspect of the invention, it features that, when data is entered from the external apparatus, a data sort of the entered data is judged, and the entered data are automatically sorted and stored into memory areas corresponding to the judged data sorts.

The above described arrangement of the invention has advantage that data can be managed such that, when different sorts of data are entered from the external apparatus, the entered data are automatically sorted and stored depending on the data sorts in the communication terminal apparatus. Further, it has advantage that data can be managed such that, when different sorts of data are entered from the external apparatus, all the entered data are stored in the common memory area in the communication terminal apparatus regardless of data sorts.

The present invention has an object of providing an easy data process for processing data having a real file name which is out of a user's management, in which data process a title that can be managed by a user is given to the data, and the data is easily processed by using such given title. Further, the present invention has an object of allowing the user to understand a title of data in the communication terminal apparatus connected to an external apparatus, when data sent from the external apparatus is stored in the communication terminal apparatus.

According to still another aspect of the invention, it features that a first identification information is given to input data to identify the same and stored in a predetermined memory, and that an extension representing a data sort is removed from a second identification information which has been given to the data by the user and stored in the memory, and that management information is created and stored in the memory, which information represents relationship between the first identification information and the second identification information with the extension removed.

The above described arrangement of the invention has advantage that, though a real file name of data is out of user's management, the user can process data in an easy manner by using a title of data which the user can manage. Further, it has advantage that, when data are entered to the communication terminal apparatus from the external apparatus connected thereto, and stored in the communication terminal apparatus, the user can easily understand the title of the data at the side of the communication terminal apparatus.

BRIEF DESCRIPTION OF THE DRAWINGS

FIG. 8A and FIG. 8B are views showing real file names and titles in a memory card.

FIG. 10A through FIG. 10C are views showing processes for removing file extensions from a management file.

DETAILED DESCRIPTION OF THE PREFERRED EMBODIMENTS

Now, an embodiment of a communication terminal or a cellular phone according to the present invention will be described with reference to the accompanying drawings.

Figure 1:
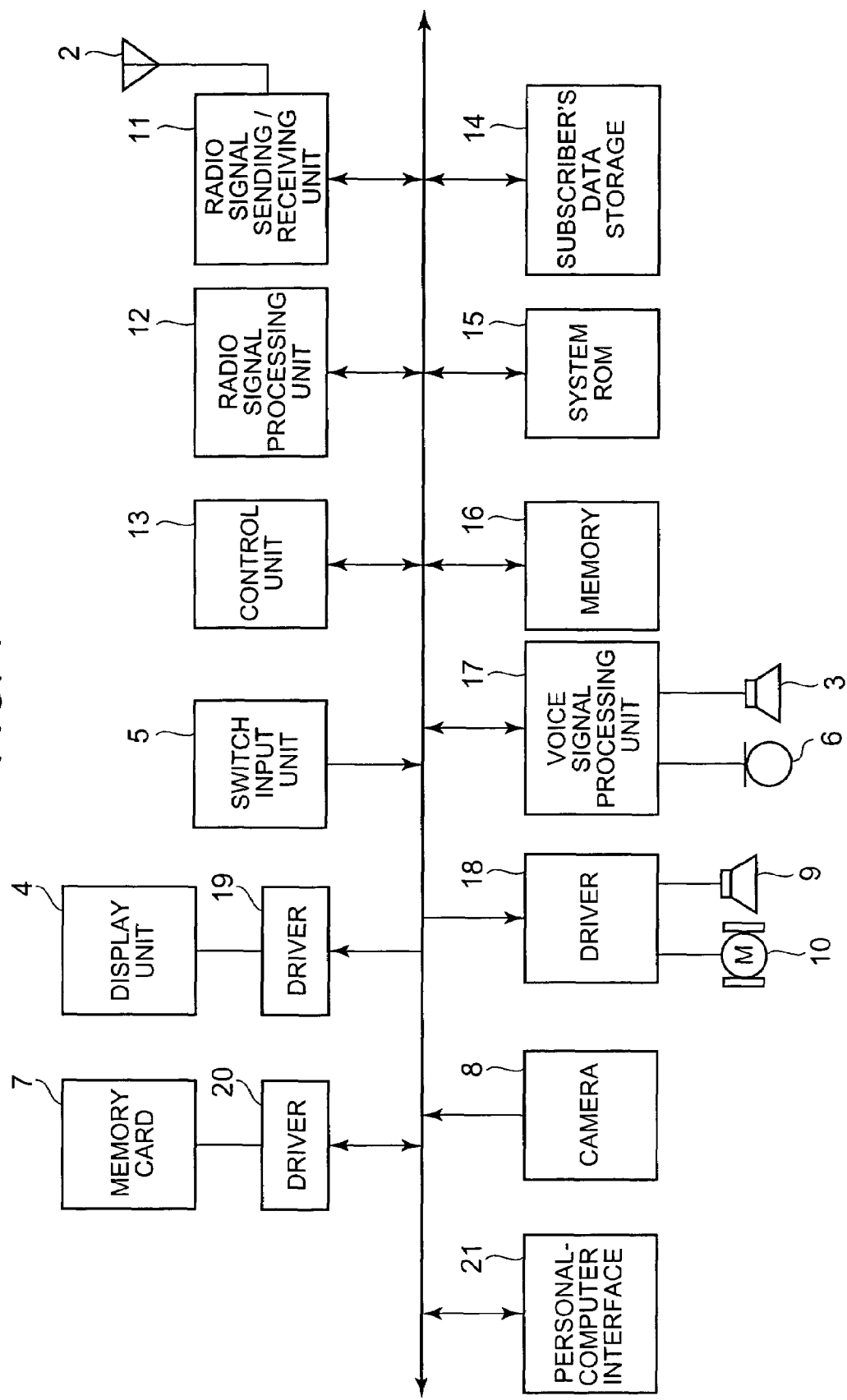
FIG. 1 is a block diagram illustrating a circuit configuration of a cellular phone according to embodiments of the invention.
Figure 2:
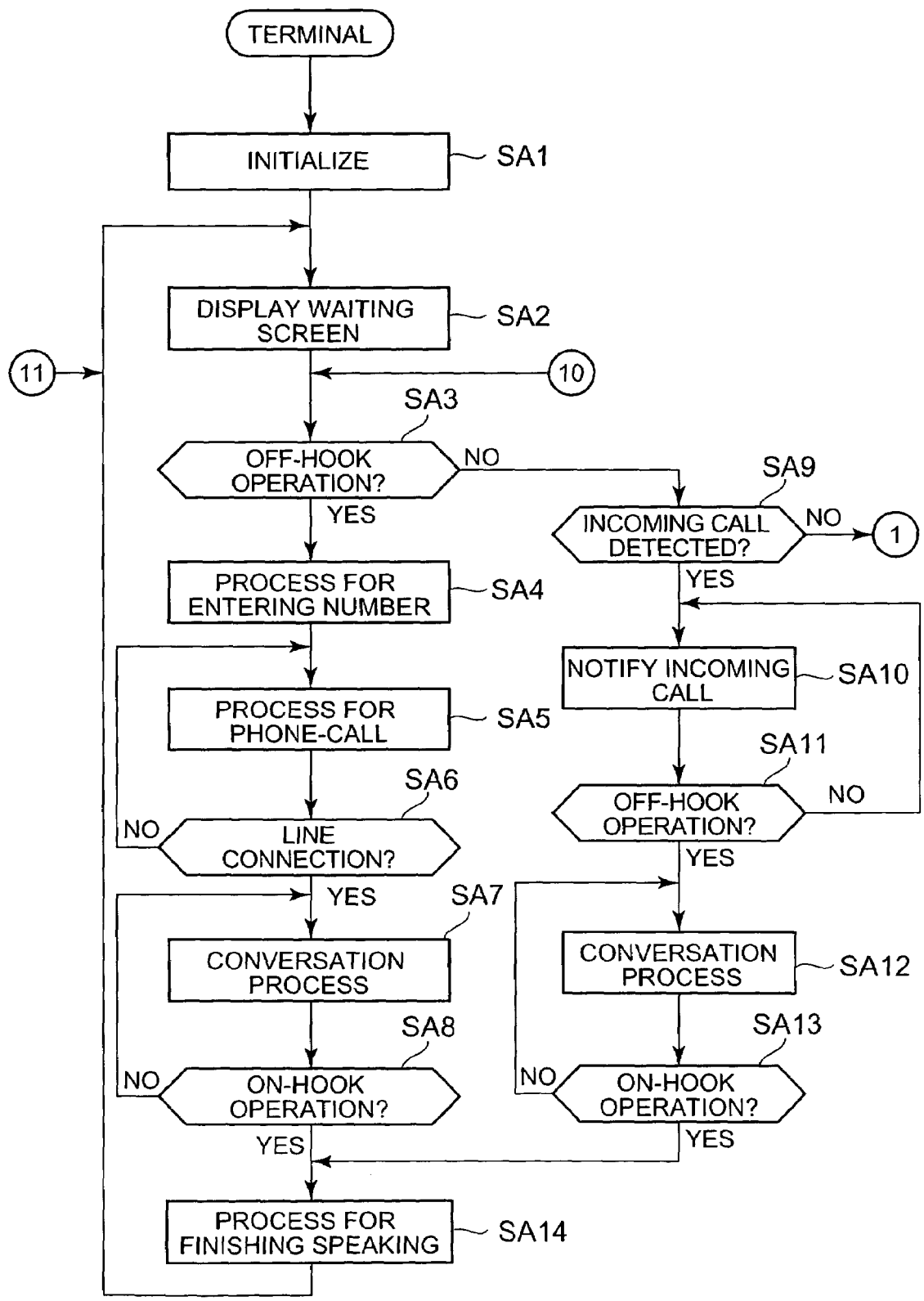
FIG. 2 is a flow chart of an operation performed in the cellular phone according to embodiments of the invention.

FIG. 1 is a block diagram illustrating a circuit configuration of the cellular phone in the embodiment of the invention. A mechanical structure of the cellular phone will be described first. A body case (not shown) of the cellular phone 1 is provided with a sending/receiving antenna 2, a voice speaker 3, a display unit 4 such as a color liquid crystal display device, a switch input unit 5, a microphone 6 for inputting a voice, a detachable recording medium 7 such as a memory card for storing data, a camera unit 8 for photographing an image to generate an image, and speaker 9 for giving a notice of an incoming call with a ring tone. The switch input unit 5 includes a character entering switch, which is also used as a dial switch, a clear switch, a cursor switch, a determination switch which is used to determining a icon selected on a display screen, a sending switch, an off-hook switch, and an on-hook switch. A vibrator 10, which vibrates to notify a user of an incoming call is built in the body case of the cellular phone 1.

An electric configuration of the cellular phone will be described hereafter. A radio signal sending/receiving unit 11 receives or sends a modified voice or data via the antenna 2. A radio signal processing unit 12 demodulates the voice and/or data received by the radio signal sending/receiving unit 11, and modulates a voice and data to be sent by the radio signal sending/receiving unit 11. A control unit 13 receives or sends commands and data via a system bus to control the whole operation of the cellular phone 1. A subscriber's data storage 14 includes an address area, a incoming-call history area, and an outgoing-call history area. The storage 14 stores subscriber's data. A system ROM 15 stores a program to be executed by the control unit 13, synthesized voice data, and various initial data. A memory 16 serves as a work area for temporarily storing data processed by the control unit 13. The memory 16 includes areas for various registers and flags.

A voice signal processing unit 17 converts voice signals of conversation over the phone or of synthesized data into an analog signal and supplies the same to the speaker 3 to generate sounds. The voice signal processing unit 17 also converts a voice signal from the microphone 6 into a digital signal and supplies the same to the control unit 13. A driver 18 drives a LED 81 of a rear-surface key 8, the speaker 9, and the vibrator 10. A driver 19 drives the display unit 4. A driver 20 drives the memory card 7. The memory card 7 has a storing capacity enough for storing image data of images generated by the camera unit 8, image data supplied from an external device, and sound data such as tune data entered from the external device. A personal-computer interface (I/F) 21 serves to exchange command and data with an external apparatus or a personal computer via a serial cable such as a USB cable.

An operation of the cellular phone having the configuration shown in FIG. 1 will be described with reference to flow charts shown in FIG. 2 through FIG. 7, a data structure in the memory card 7 of the cellular phone 1 shown in FIG. 8 through FIG. 10, as well as a flow chart of the external personal computer shown in FIG. 11 through FIG. 14.

An operation of the communication terminal, i.e., the cellular phone will be described first. In the flow chart of FIG. 2, the cellular phone is initialized in a predetermined manner at step SA1. Then, a waiting screen is displayed at step SA2. It is judged at step SA3 whether off-hook operation has been taken place or not. When off-hook operation has been taken place, a display screen for entering a phone number is displayed on the display unit 4 and the entered phone number is stored in the memory 16. Then, a process is performed for the entered phone number at step SA4.

A phone-call process is executed in response to on-operation of a transmission switch at step SA5, and it is judged at step SA6 whether a line connection has been established or not. When the line connection has been established, the operation transits to a conversation process at step SA7, where communication is made between two parties. Thereafter, it is judged at step SA8 whether on-hook operation has been taken place. When on-hook operation has been taken place, a process for finishing speaking such as a line breaking process is executed at step SA14, and the operation returns to step SA2, where the waiting screen is displayed again.

When it is determined at step SA3 that off-hook operation has not been taken place, it is judged at step SA9 whether an incoming call has been detected or not. When the incoming call has been detected, a notice of the incoming call is given to the user at step SA10. Then, it is judged at step SA11 whether off-hook operation has been taken place or not. When off-hook operation has been taken place, the operation transits to a conversation process at step SA12. During the conversation process, it is judged at SA13 whether or not on-hook operation has been taken place. When on-hook operation has been taken place, the process for finishing speaking is executed at step SA14, and the operation returns to step SA2, where the waiting screen is displayed again.

Figure 3:
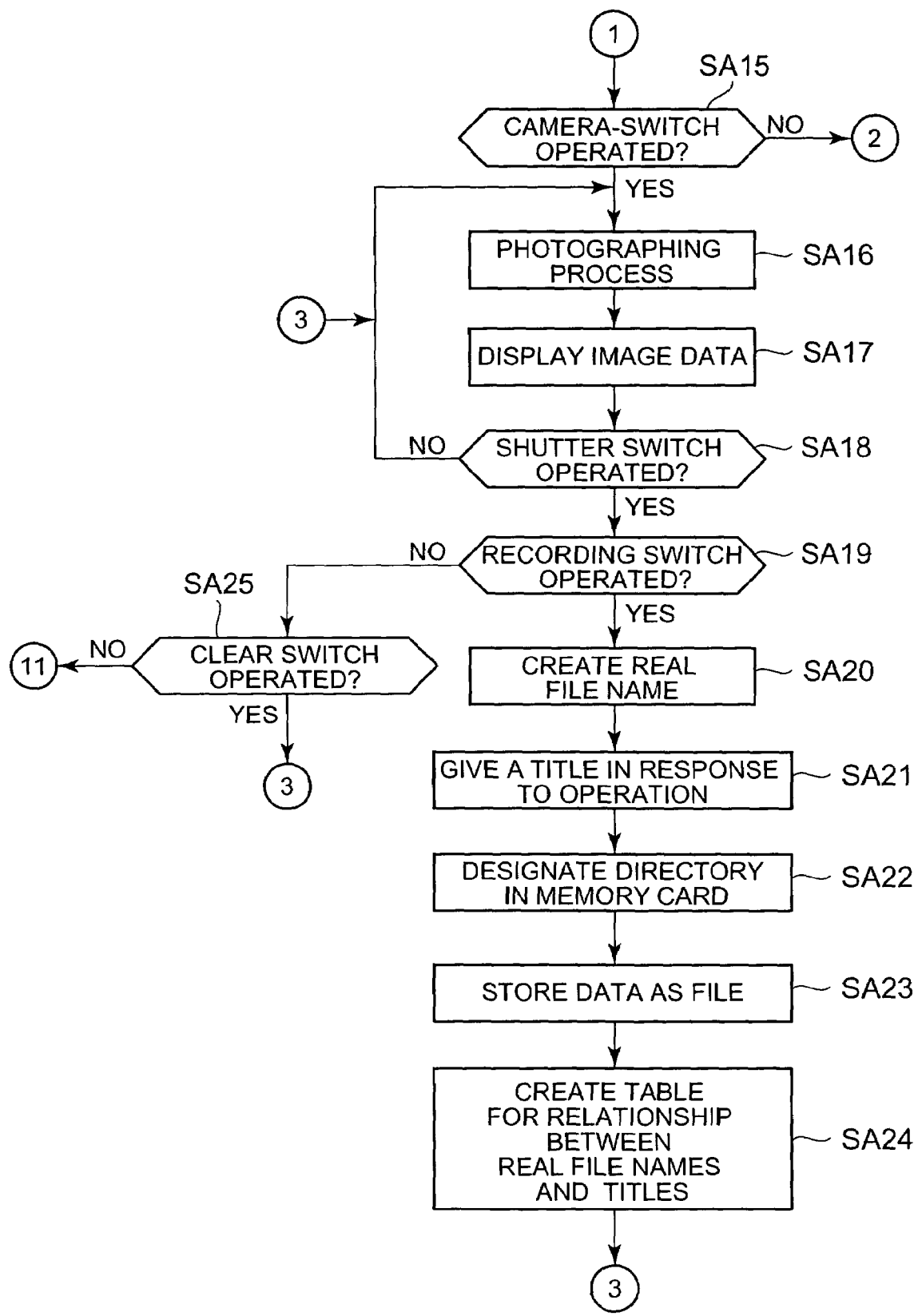
FIG. 3 is a flow chart of an operation performed in the cellular phone, following to that shown in FIG. 2.
Figure 4:
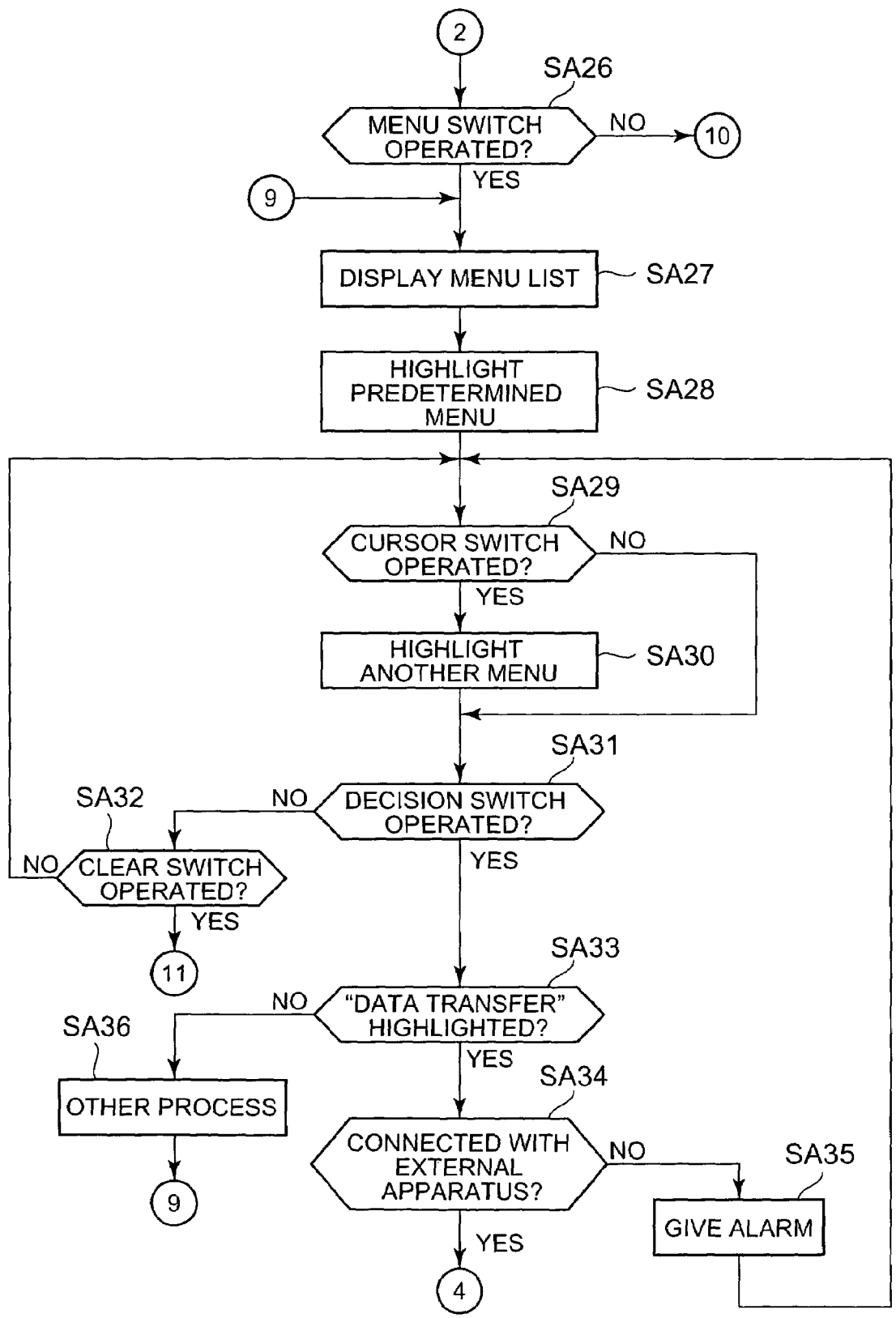
FIG. 4 is a flow chart of an operation performed in the cellular phone, following to that shown in FIG. 3.
Figure 5:
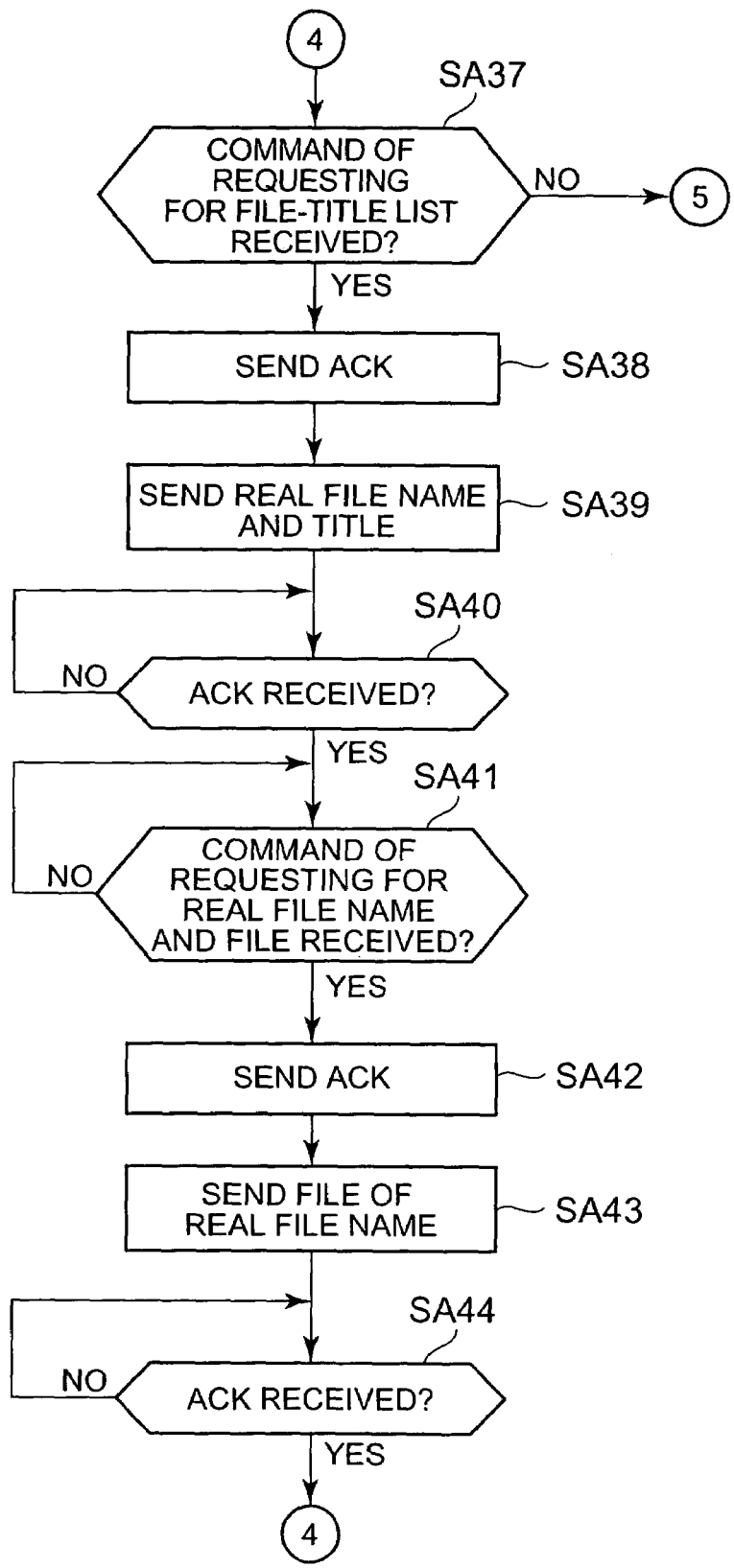
FIG. 5 is a flow chart of an operation performed in the cellular phone, following to that shown in FIG. 4.
Figure 6:
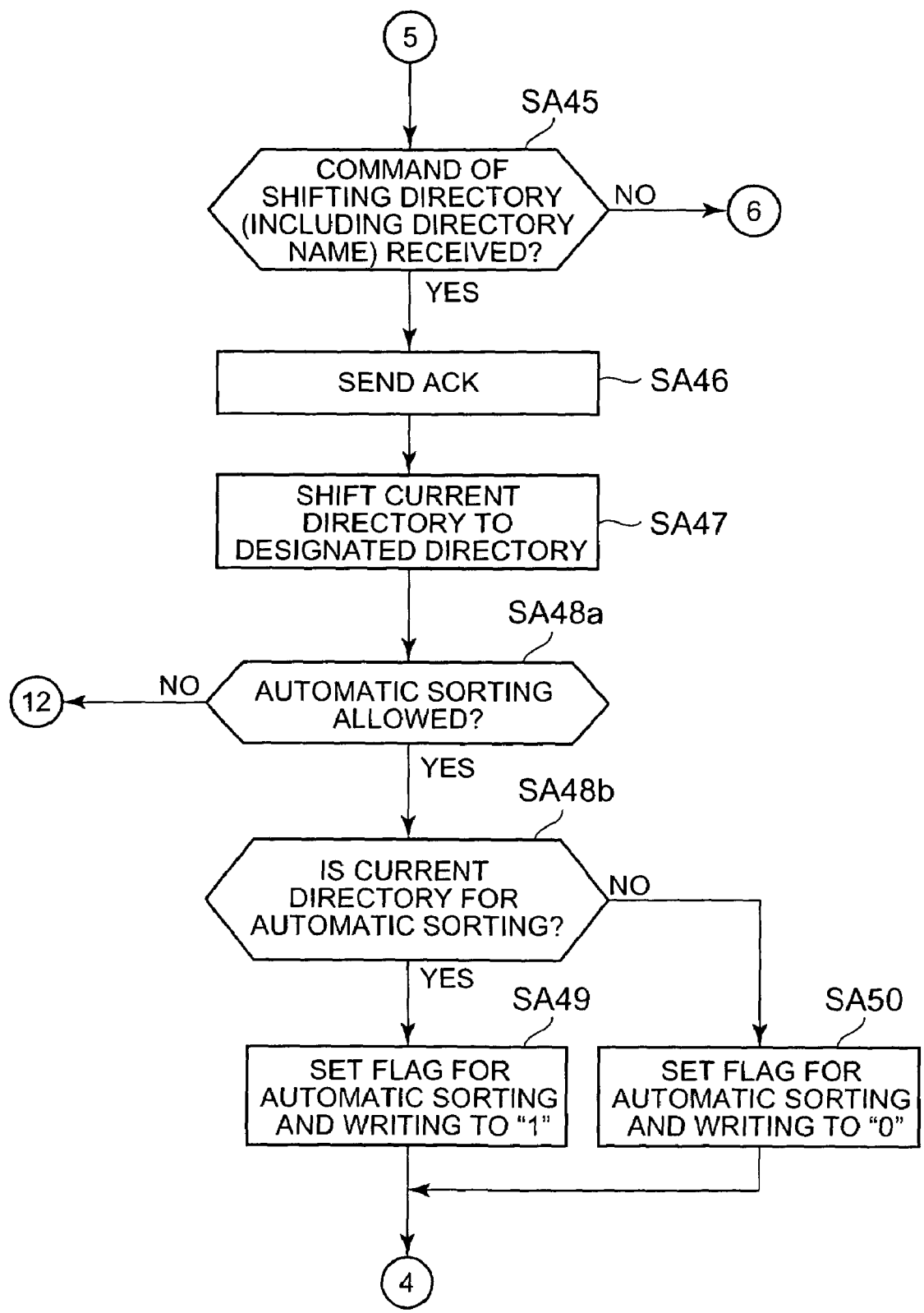
FIG. 6 is a flow chart of an operation performed in the cellular phone, following to that shown in FIG. 5.
Figure 7:
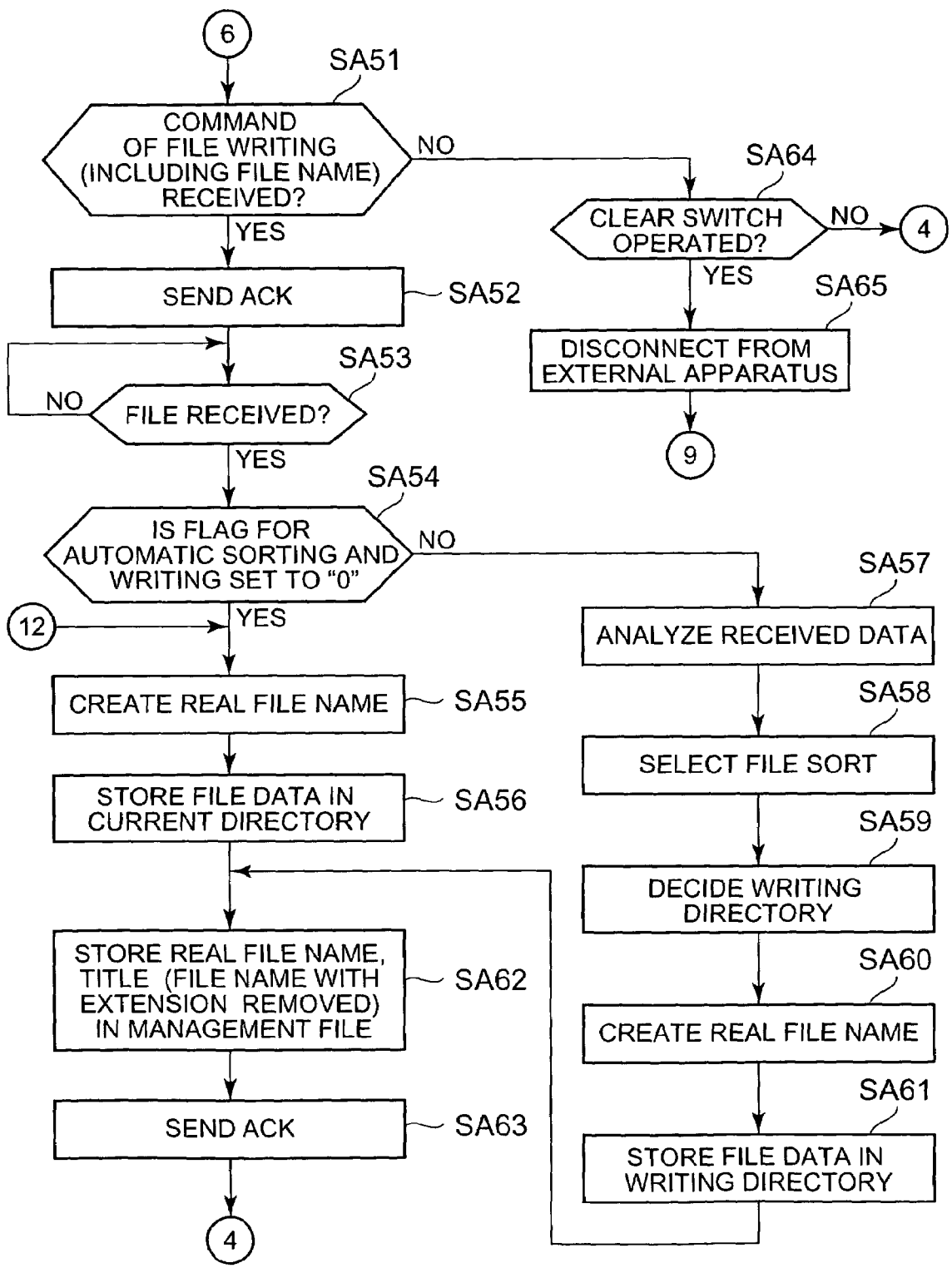
FIG. 7 is a flow chart of an operation performed in the cellular phone, following to that shown in FIG. 6.

When no incoming call has been detected at step SA9, it is judged at step SA15 in the flowchart shown in FIG. 3 whether a camera switch is operated or not. When the camera switch is operated, a photographing process is executed at step SA16 for preparing to take a picture, and an image pick-up element such as CCD is made active. Image data generated by the image pick-up element is displayed at step SA17 and it is judged at step SA18 whether or not a shutter switch has been operated. When the shutter switch has not been operated, the photographing process of step SA16 and a display process of step SA17 are repeatedly performed. When the shutter switch has been operated, the image data which is on the display unit 4 at the time when the shutter is operated is transferred to the memory 16 to be temporarily stored therein and it is judged at step SA19 whether a recording switch has been operated.

When the recording switch has been operated, a real file name for uniquely identifying the image data is automatically created at step SA20. A process is executed at step SA21 to input a title in accordance with switching operation by the user. For example, the title such as "summer holidays" and "athletic meeting" is added in response to entering operation. Then, a directory in the memory card 7 where the image data is to be stored is designated at step SA22. The image data temporarily stored in the memory 16 is stored as a file in the designated directory at step SA23.

A title management file or a table showing a relationship between the real file names and the titles is created in a management file of the memory card 7 at step SA24.

A directory structure in the memory card 7 and the table showing the relationship between the real file names and the titles are shown in FIG. 8A and FIG. 8B. Files of image data with a title management file, "DATAFILE.MGR" and real file names, "ph_ab000.png", mv_ab000.amc", and "aaaa0000.jpg" added thereto are stored in the directory structure shown in FIG. 8A. The title management file shows the relationship between the real file names and the titles, and includes a file-title list representing data list, as shown in FIG. 8B.

When it is determined at step SA19 (FIG. 3) that the recording switch is not operated, it is judged at step SA25 whether or not the clear switch has been operated. When the clear switch has been operated, the image data temporarily stored in the memory 16 and displayed on the display unit 4 is deleted, and the operation goes to step SA16, where the photographing process is executed again. When the clear switch is not operated, the operation goes to step SA2 (FIG. 2), where the waiting screen is displayed again.

When it is determined at step SA15 (FIG. 3) that the camera switch is not operated, it is judged at step SA26 (FIG. 4) whether or not a menu switch has been operated. When the menu switch has been operated, a menu list is displayed on the display unit 4 at step SA27. A predetermined menu (for example, a leading menu) is highlighted at step SA28. In particular, the leading menu is displayed in a different color from the color in which other menus are displayed. It is judged at step SA29 whether or not a cursor switch has been operated. When the cursor switch has been operated, another menu is highlighted at step SA30, and it is judged at step SA31 whether or not a decision switch has been operated. When the decision switch is not operated, it id judged at step SA32 whether or not the clear switch is operated. When the clear switch has been operated, the operation goes to step SA2 (FIG. 2), where the waiting screen is displayed. When the clear switch is not operated, the operation goes to step SA29, where it is judged whether the cursor switch has been operated.

When it is determined at step SA31 that the decision switch has been operated, it is judged at step SA33 whether a "Data transfer" in the menu list is highlighted. When the "data transfer" is highlighted, it is judged at step SA34 whether connection has been established between the cellular phone and an external apparatus, i.e., a personal computer. When the connection between the cellular phone and the external apparatus is not yet established, a caution is given at step SA35 and the operation goes to step SA29, where it is judged whether the cursor switch has been operated. Meanwhile, when it is determined at step SA33 that the data transfer is not highlighted, that is, when a menu other than the data transfer is highlighted, a process corresponding the highlighted menu is executed at step SA36, and thereafter the operation goes to step SA27, where the menu list is displayed on the display unit 4 again.

When it is determined at step SA34 that the connection is established between the cellular phone and the external apparatus, it is judged at step SA37 (FIG. 5) whether or not a command of requesting for a file-title list is received from the external apparatus. When the command is received, ACK or a message of acknowledging receipt of the command is sent back to the external apparatus at step SA38. The real file name and the title in the management fila are sent to the external apparatus at step SA39, and then it is judged at step SA40 whether ACK is received from the external apparatus or not. When ACK is received, it is judged at step SA41 whether or not a command of requesting for a real file name and a file is received from the external apparatus, the is, it is judged whether or not a request for transferring a file specified by the real file name has been made.

When the command of requesting for a real file name and a file is received, ACK is sent back to the external apparatus at step 42, and a file having the real file name in the directory shown in FIG. 8A is sent to the external apparatus at step SA43. It is judged at step SA44 whether ACK is received from the external apparatus or not. When ACK is received, the operation goes to step SA37, where it is judged whether or not the command of requesting for a file-title list is received.

When it is determined at step SA37 that the command of requesting for a file-title list is received, it is judged at step SA45 (FIG. 6) whether or not a command of shifting a directory (including a directory name) is received from the external apparatus. When the command is received, ACK is sent back to the external apparatus at step SA46. When the current directory is different from the designated directory name, the current directory transits to the designated directory at step SA47. It is judged at step SA48a whether or not the memory card 7 is of a directory structure which allows automatic sorting. When the memory card 7 is of the directory structure that allows the automatic sorting, it is judged at step SA48b whether the current directory is for the automatic sorting or not. When the current directory is for the automatic sorting, a flag for sorting and writing automatically is set to "1" at step SA49. When the current directory is not for the automatic sorting, a flag for sorting and writing automatically is reset to "0" at step SA50. After the flag has been set to "1" or to "0", the operation goes to step SA37 (FIG. 5), where it is judged whether the command of requesting for a file-title list is received or not.

Figure 9A:
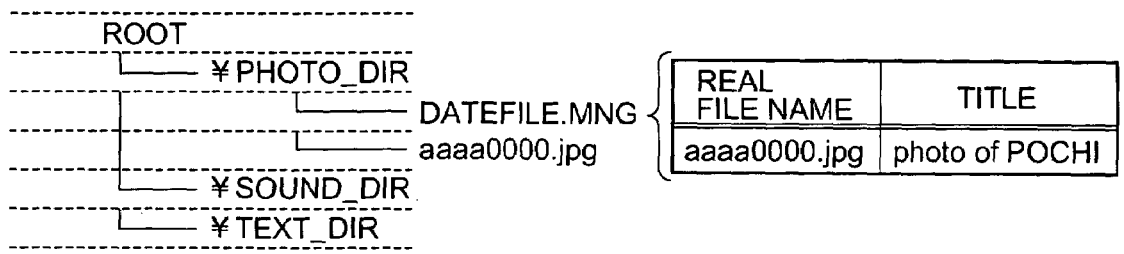
FIG. 9A through FIG. 9D are views showing directory structures in the memory card.
Figure 9B:
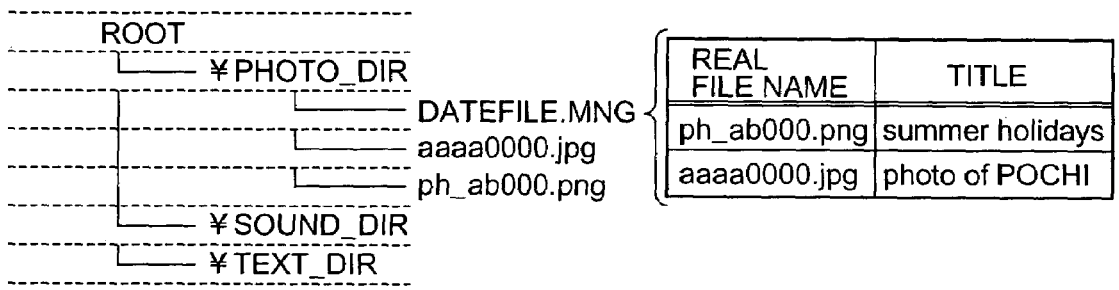
Figure 9C:
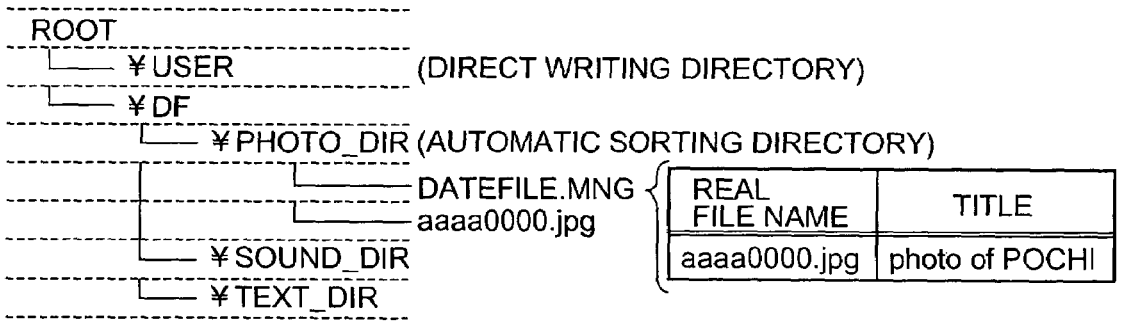
Figure 9D:
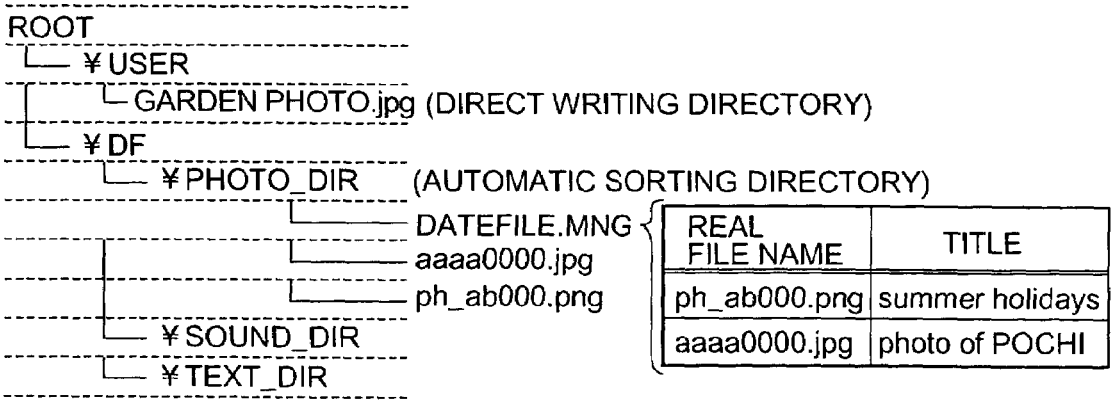

In the present embodiment, the memory card 7 is of the directory structure allowing the automatic sorting, in which a directory is automatically designated depending on a sort (or contents) of the file to be stored in the memory card 7. FIG. 9A through FIG. 9D are views showing directory structures in the memory card 7. As shown in FIG. 9A through FIG. 9D, the directory structure consists of a directory "YPHOTO_DIR" for storing image files including still image files and moving image files, a directory "YSOUND_DIR" for storing sound files such as music, a directory "YTEXT_DIR" for storing text files such as characters, numerals and symbols. The memory card 7 is configured such that the automatic sorting or non automatic sorting can be selected depending on the set mode. FIG. 9A and FIG. 9B are views showing the directory structure of the memory card 7 ensured to execute the automatic sorting depending on the sort of the file to be stored therein. On the contrary, FIG. 9C and FIG. 9D are views showing the structure of the memory card 7, in which an automatic sorting mode is selected or not.

When it is determined at step SA45 (FIG. 6) that the command of shifting a directory is not received from the external apparatus, it is judged at step SA51 (FIG. 7) whether or not a command of writing a file (including a command name) is received from the external apparatus. When the command is received, ACK is sent back at step SA52. Then, it is judged at step SA53 if a file is received. When the file is received, it is judged at step SA54 whether the flag of the automatic sorting is set to "1" or "0". When the flag is set to "0", or when a mode of allowing the automatic sorting is not selected, that is, when the automatic sorting mode is selected, a real file name is created at step SA55 and file data is stored in the current directory at step SA56.

In case that it is determined at step SA48a that the mode allowing the automatic sorting is not set, when a new file is received from the external apparatus with the real file name of "aaaa0000.jpg" stored in the image file directory of "YPHOTO_DIR" and with the relationship between the real file name and the title stored in the management file "DATA-FILE.MNG" as shown in FIG. 9A, a file having the real file name "ph_ab000.png" is stored in the image file directory "YPHOTP_DIR" and the relationship between the real file name and the title is added to the management file "DATA-FILE.MNG".

In case that it is determined at step SA48a that the memory card 7 is of a directory structure which allows automatic sorting, and that the flag for sorting and writing automatically is set to "0", when a new file is received from the external apparatus with the real file name of "aaaa0000.jpg" stored in the image file directory of "YPHOTO_DIR" and with the relationship between the real file name and the title stored in the management file "DATA-FILE.MNG" as shown in FIG. 9C, file data having the title of "garden.jpg", which extension "jpg" is added in the external apparatus, is stored in a direct writing-in directory "YUSER", as shown in FIG. 9D.

Meanwhile, in case that it is determined at step SA48a that the memory card 7 is of a directory structure which allows automatic sorting, and that the flag of the automatic sorting is set to "1", since it is determined at step SA54 (FIG. 7) that the flag of automatic sorting and writing in is set to "1", received data is analyzed at step SA57, and a sort of file is selected at step SA58, and then a directory into which data is written is decided at step SA59. Then, a real file name is created at step SA60, and file data is written into the designated directory at step SA61. For example, when a new file is received from the external apparatus with a file of "aaaa0000.jpg stored in the image directory "YPHOTO_DIR" and with the relationship between the real file name and the title stored in the management file "DATA-FILE.MNG" as shown in FIG. 9C, file data is stored in the automatic sorting directory "YPHOTO_DIR", which file data has a real file name of "ph_ab000.jpg" which is given in the terminal, as shown in FIG. 9D.

After the file data has been stored at step SA56 or at step SA61, the real file name and the title with the extension removed from the file name are stored in the management file "DATAFILE.MNG" at step SA62, and then ACK is sent back to the external apparatus at step SA63. A process for removing an extension from the management file is shown in FIG. 10A through 10C. The management file is shown in FIG. 10A. When a file and a file name with its extension, i.e., "summer holidays.png" are transferred from the external apparatus, and such file name of "summer holidays.png" is used for the title, the management file will become that shown in FIG. 10B, and the title will be "summer holidays.png", in other words the title will include meaningless character series "png", which will introduce confusion that the title might be misunderstood as a file name. Therefore, to avoid needless confusion, the file name with the extension removed therefrom is stored in the management file as shown in FIG. 10C.

When ACK has been sent back to the external apparatus at step SA63, the operation returns to step SA37 (FIG. 5), where it is judged whether or not the command of requesting a file-title list is received. When the command of requesting a file-title list is not received, it is judged at step SA45 (FIG. 6) whether or not the command of shifting a directory (including a directory name) is received from the external apparatus. When no, the operation goes to step SA51 (FIG. 7), where it is judged whether or not the command of writing a file (including a file name) is received. When the command is not received, it is judged at step SA64 whether the clear switch has been operated or not. When the clear switch is not operated, the operation returns to step SA37 (FIG. 5) again, where it is judged whether or not the command of requesting a file-title list is received. When the clear switch has been operated, the connection with the external apparatus is broken at step SA65. Then, the operation goes to step SA27, where the menu list is displayed again.

Figure 11:
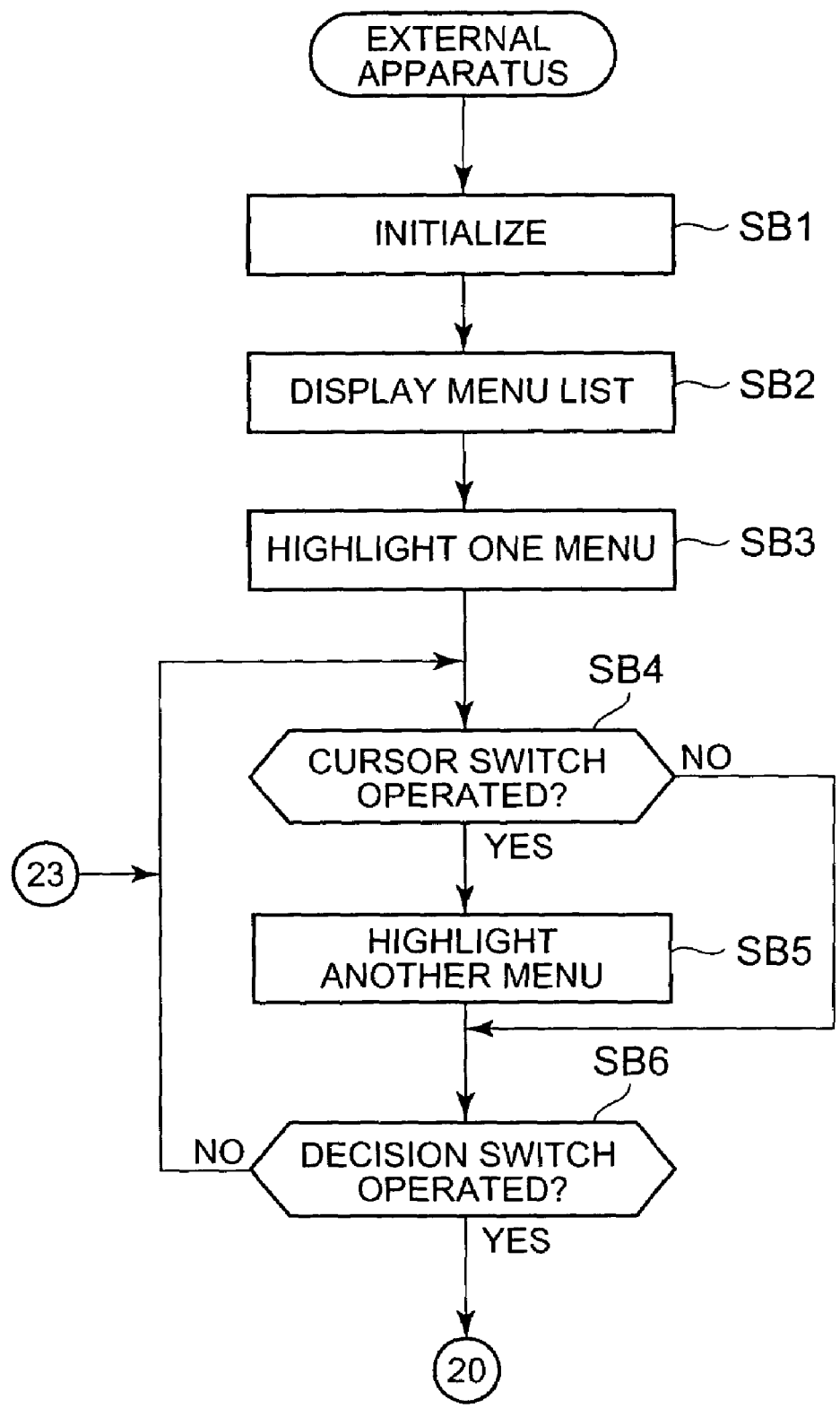
FIG. 11 is a flow chart of an operation performed by an external apparatus.
Figure 12:
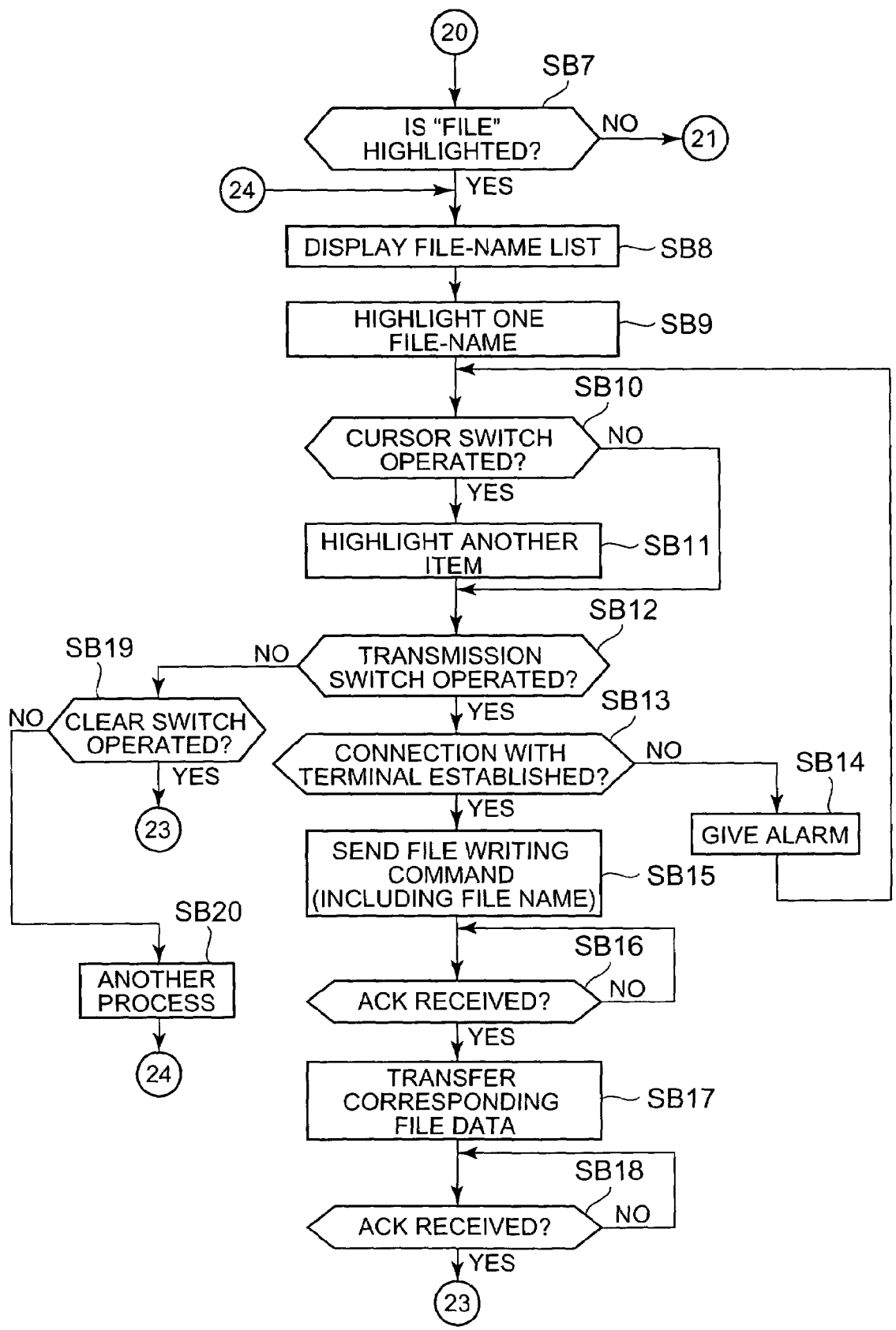
FIG. 12 is a flow chart of an operation performed by the external apparatus, following to that shown in FIG. 11.
Figure 13:
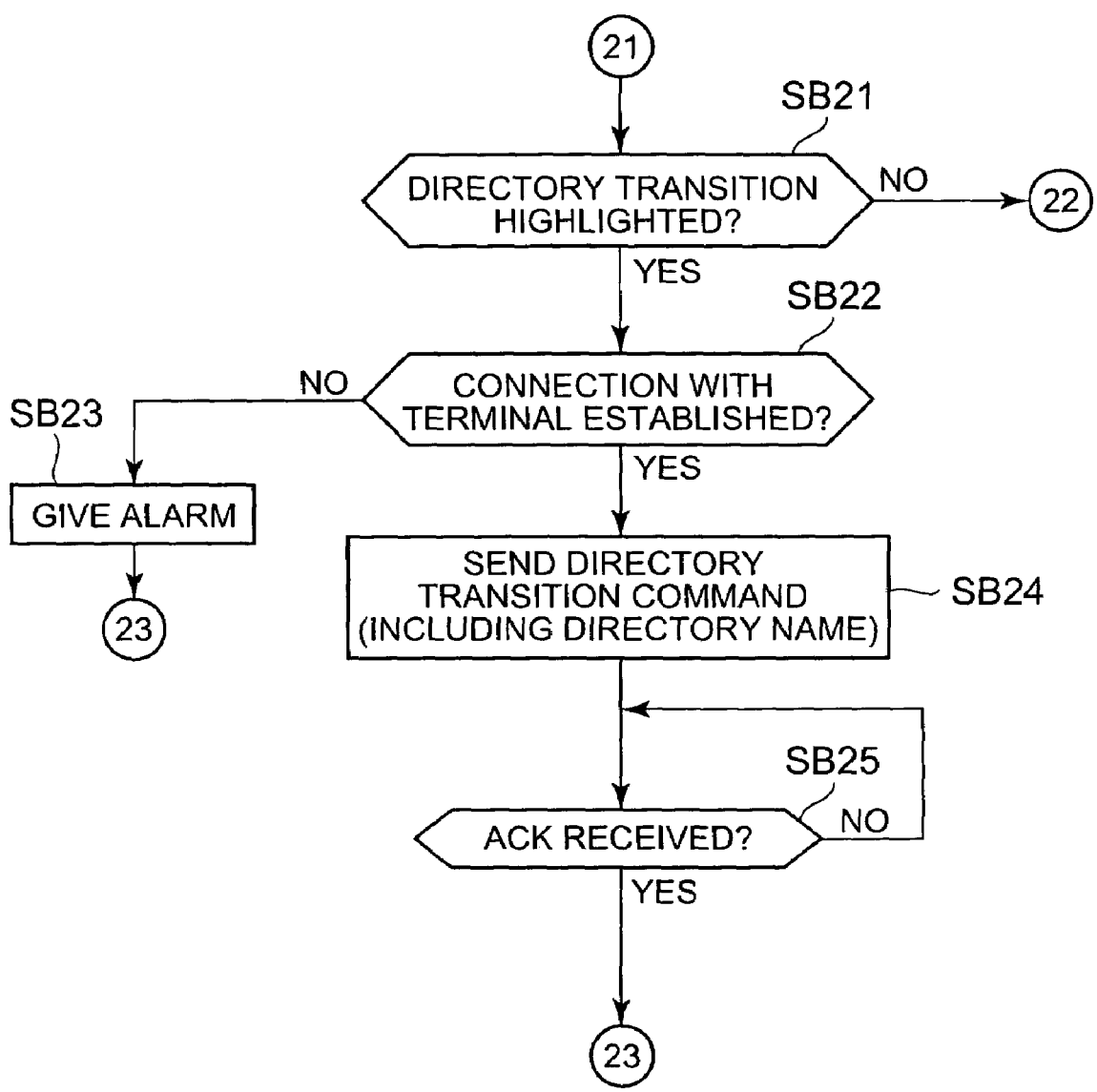
FIG. 13 is a flow chart of an operation performed by the external apparatus, following to that shown in FIG. 12.
Figure 14:
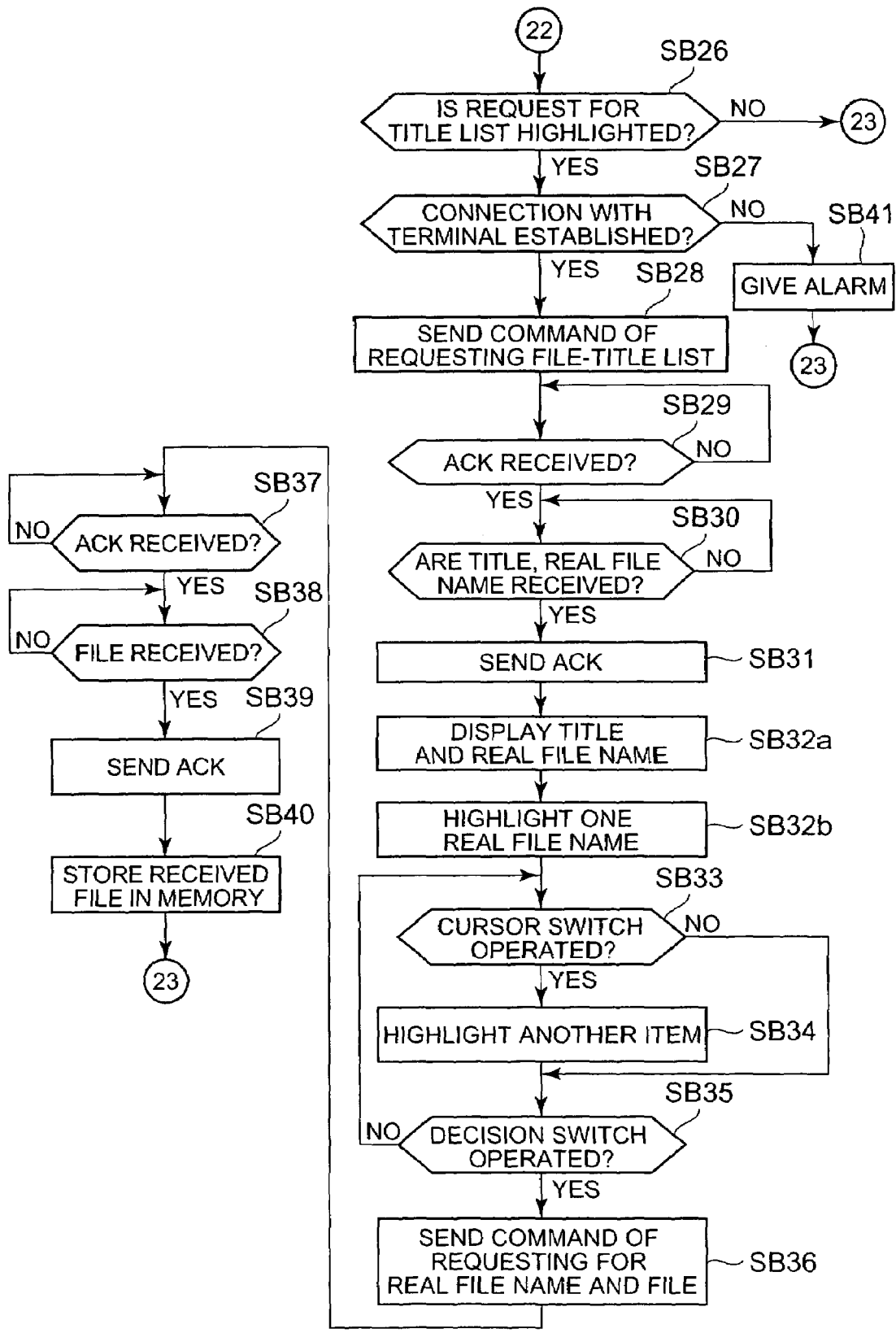
FIG. 14 is a flow chart of an operation performed by the external apparatus, following to that shown in FIG. 13.

Operation of the external apparatus will be describe with reference to FIG. 11. The external apparatus is initialized at step SB1, and a menu list is displayed at step SB2. One list in the menu list is highlighted at step SB3, and it is judged at step SB4 whether or not the cursor switch has been operated. When the cursor switch has been operated, another list in the menu list is highlighted at step SB5. And it is judged at step SB6 whether the decision switch has been operated or not. When the decision switch has not been operated, the operation returns to step SB4, where it is judged whether or not the cursor switch has been operated.

When the decision switch has been operated, the operation goes to step SB7 (FIG. 12), where it is judged whether or not a "File" in the menu list is highlighted. When the "File" in the menu list is highlighted, a file-name list is displayed at step SB8 and one file name in the file-name list is highlighted at step SB9. It is judged at step SB10 whether or not the cursor switch has been operated. When the cursor switch has been operated, another menu in the menu list is highlighted at step SB11. And it is judged at step SB12 whether a transmission switch has been operated or not.

When the transmission switch has been operated, it is judged at step SB13 whether a connection with a terminal device has been established or not. When the connection with a terminal device is not established, an alarm is generates at step SB14 and the operation returns to step SB10, where it is judged whether the cursor switch has been operated or not. When the connection with a terminal device has been established, the command of writing a file (including a file name) is sent to the terminal device at step SB15. It is judged at step SB16 whether or not ACK is received from the terminal device. When ACK is received from the terminal device, file data corresponding to the "File name" that is highlighted in the menu list is transferred to the terminal device at step SB17. It is judged at step SB18 whether or not ACK is received from the terminal device, and when ACK is received from the terminal device, a file-name list screen is deleted, the operation goes to step SB4 (FIG. 11), where it is judged whether or not the cursor switch has been operated with the menu list being displayed.

When it is determined at step SB12 that the transmission switch is not operated, it is judged at step SB19 whether the clear switch has been operated. When the clear switch is not operated, another process is performed at step SB20, and the operation returns to step SB8, where the file-name list is displayed again. When the clear switch has been operated, the file-name list screen is deleted, and the operation goes to step SB4 (FIG. 11), where it is judged whether or not the cursor switch has been operated with the menu list being displayed.

When it is determined at step SB7 that the "File" in the menu list is not highlighted, then it is judged at step SB21 (FIG. 13) whether or not "Directory transition" in the menu list is highlighted. When the "Directory transition" in the menu list is highlighted, it is judged at step SB22 whether the connection with the terminal device has been established or not. When the connection with the terminal device is not established, an alarm is generates at step SB 23 and the operation returns to step SB4 (FIG. 11), where it is judged whether or not the cursor switch has been operated with the menu list being displayed. When it is determined at step SB22 that the connection with the terminal device has been established, a command of directory transition (including a directory name) is sent to the terminal device at step SB24. It is judged at step SB25 whether or not ACK is received. When ACk is received, the operation goes to step SB4 (FIG. 11), where it is judged whether or not the cursor switch has been operated with the menu list being displayed.

When it is determined at step SB21 that the "Directory transition" in the menu list is not highlighted, the operation goes to step SB26 (FIG. 14) where it is judged whether or not "Request for title list" is highlighted. When "Request for title list" is highlighted, it is judged at step SB27 whether or not the connection with the terminal device has been established. When the connection with the terminal device has been established, the command of requesting for file-title list is sent to the terminal device at step SB28. It is judged at step SB29 whether or not ACK is received. When ACk is received, it is judged at step SB30 whether or not a title and a real file name are received. When these are received, ACK is sent back to the terminal device at step SB31.

The received titles and real file names are displayed at step SB32a. One real file name among the received real file names is highlighted at step SB32b. It is judged at step SB33 whether the cursor switch has been operated. When the cursor switch has been operated, another item is highlighted at step SB34, and it is judged at step SB35 whether or not the decision switch has been operated. When the decision switch is not operated, the operation goes to step SB33, where it is judged whether the cursor switch has been operated. When the decision switch has been operated, the command of requesting for the real file name and title that are highlighted is sent to the terminal device at step SB36.

It is judged at step SB37 whether or not ACK is received. When ACk is received, it is judged at step SB38 whether or not a file is received. When the file is received, ACK is sent back to the terminal device at step SB39. Then, the received file is stored in the memory at step SB40. When it is determined at step SB27 that the connection with the terminal device is not established, an alarm is generates at step SB 41. After the alarm is generated, or when it is determined at step SB 26 that the title-name list is not highlighted, or after the received file is stored in the memory at step SB40, the operation returns to step SB4 (FIG. 11), where it is judged whether or not the cursor switch has been operated with the menu list being displayed.

In the embodiment described above, the control unit 13 stores in the memory card 7 the received data with the real file name for uniquely identifying the same, inputs the title to be attached to the received data in response to operation by the user, and stores in the memory card 7 the management file representing relationships between the real file names and titles which are given respectively to plural pieces of data. Therefore, with respect to data having the real file name that is out of the user's control, the user can process data easily by using the title that is under control of the user.

In the embodiment describe above, the control unit 13 sends back to an external apparatus the management file and data stored in the memory card 7 upon receipt of a request from the external apparatus. Therefore, with respect to data attached with a real file name, which is out of the user's control, data transmission may be effected with use of the received management file without any troublesome procedure. Upon receipt of request for data corresponding to a real file name from the external apparatus after sending to the external apparatus a management file in response to a request from the same, the control unit 13 sends the data corresponding to the real file name. Therefore, the data which the external apparatus requests to send may be specified without confusion in the external apparatus by using the title corresponding to the real file name.

The memory card 7 used in the present embodiment has plural automatic sorting directories each for storing a kind of data. The control unit 13 analyzes the kind of data which is input from the external apparatus and stores the data in the automatic sorting directory of the memory card 7 which is assigned to the analyzed kind of data. Therefore, in case that plural kinds of data are input from the external apparatus to the cellular phone 1, such data management is allowed that the plural kinds of data are stored respectively in the directories assigned respectively to the kinds of the data.

In the embodiment, in case that the control unit 13 determines that the data input from the external apparatus accompanies with an instruction of sorting and storing data automatically depending on the kind of such data, input data is sorted and stored respectively in the automatic sorting directories of the memory card 7 depending on the kinds of the input data. Mean while, in case the control unit 13 determines that the data input from the external apparatus accompanies with no instruction of sorting and storing data automatically depending on the kind of such data, the input data is stored in the direct writing directory of the memory card 7 in spite of the kind of the input data. Therefore, in case plural sorts of data is input to the cellular phone 1, such data management is allowed that all the input data is stored in the direct writing directory of the memory card in spite of the kind of the input data.

In the embodiment, the control unit 13 creates management files respectively for the automatic sorting directories of the memory card 7 prepared respectively for the kinds of the data and stores the management files in the memory card 7, each of which management file represents a relationship between a title for identifying data in the external apparatus and a real file name for uniquely identifying data input from the external apparatus. Therefore, in case that different kinds of data are input from the external apparatus to the cellular phone 1, such data management is allowed that the plural kinds of data are stored respectively in the directories assigned respectively to the kinds of the data.

In the embodiment, the control unit 13 stores in the memory card 7 input data attached with a real file name for uniquely identifying the same, removes an extension for representing the kind of the data from the title which is previously given to the stored data and is under control of the user, and creates management information which represents the relationship between the real file name and the title having no extension, both real file name and the title being given to the same data. Therefore, the user is allowed to process, without any difficulty, the data having the real file name which is not under control of the user, by using the title which is under control of the user.

Further, in the embodiment of the invention, the control unit 13 removes an extension included in the title of the data received from the external apparatus, which extension is used for data management in the external apparatus. Therefore, when the data transferred from the external apparatus to the cellular phone 1 is stored in the cellular phone 1, the user of the cellular phone 1 can easily recognize the title of the data.

The embodiment of the apparatus according to the invention has been described, in which the control unit 13 processes communication information in accordance with the program previously stored in the system ROM. The apparatus may be modified such that a program for processing communication information is read out from a detachable memory card and written into a writable system ROM such as a nonvolatile memory, or the program for processing the communication information is downloaded from an external server via the network into the writable system ROM, and the control unit 13 executes the program to process communication information.

What is claimed is:

1. A communication terminal apparatus comprising:

storage control means for assigning, to input data, first identification information for identifying the input data, and for storing the input data in a predetermined memory;

input means for inputting second identification information, in response to operation by a user, to be assigned to the data stored in the memory;

information generating means for generating management information representing a relationship between the first identification information and the second identification information, both having been assigned to the data, and for storing the management information in the memory; and communication control means for, upon receipt of a transmission request from an external apparatus, transmitting to the external apparatus the management information and the data, which are both stored in the memory;

wherein the communication control means transmits data corresponding to the first identification information to the external apparatus, when the communication apparatus receives from the external apparatus a transmission request for transmitting the data corresponding to the first identification information after having transmitted the management information to the external apparatus.

2. A communication terminal apparatus comprising:
a memory including a plurality of memory areas assigned respectively to a plurality of types of data;
analyzing means for analyzing a type of data input from an external apparatus; and
storage control means for storing the input data in the corresponding memory area of the memory assigned to the type of the data as analyzed and confirmed by the analyzing means;
wherein the storage control means sorts and stores the data input from the external apparatus in the corresponding memory areas of the memory depending on the types of the data analyzed and confirmed by the analyzing means, when the analyzing means confirms that each data input from the external apparatus accompanies a write-in command, which includes an instruction to sort and store data in the corresponding memory areas assigned respectively to the data types, and the storage control means stores the data input from the external apparatus in another memory area of the memory irrespective of the type of the data, when the analyzing means confirms that the data input from the external apparatus does not accompany the write-in command.

3. A communication terminal apparatus comprising:
storage control means for assigning, to input data, first identification information for identifying the input data, and for storing the input data in a predetermined memory;
information processing means for removing an extension, representing a type of data, which is included in second identification information which is previously assigned to data stored in the memory and can be managed by a user;
information generating means for generating management information representing a relationship between the first identification information assigned to the data and the second identification information with the extension removed by the information processing means, and for storing the management information in the memory; and
communication control means for receiving data from an external apparatus, wherein the second identification information is assigned to the data by the external apparatus, and the extension removed by the information processing means is for data management in the external apparatus.

4. A computer-readable storage medium having a communication information processing program stored thereon that is executable by a computer to cause the computer to perform a process comprising:
assigning, to input data, first identification information for identifying the input data, and storing the input data in a predetermined memory;
inputting, in response to an operation by a user, second identification information to be assigned to the data stored in the memory;
generating management information representing a relationship between the first identification information and the second identification information, both having been assigned to the data, and storing the management information in the memory;
upon receipt of a transmission request from an external apparatus, transmitting to the external apparatus the management information and the data, which are both stored in the memory; and
transmitting data corresponding to the first identification information to the external apparatus, when a transmission request for transmitting the data corresponding to the first identification information is received after the management information has been transmitted to the external apparatus.

5. A computer-readable storage medium having a communication information processing program stored thereon that is executable by a computer to cause the computer to perform a process comprising:
analyzing a type of data input from an external apparatus; and
storing the data in a memory area of a memory assigned to the type of the input data as analyzed and confirmed;
wherein the memory includes a plurality of memory areas assigned respectively to a plurality of types of data; and
wherein said storing comprises:
storing the data input from the external apparatus in the corresponding memory areas of the memory, depending on the analyzed and confirmed types of the data, when it is confirmed that the data input from the external apparatus accompanies a write-in command, which includes an instruction to store data in the corresponding memory areas assigned respectively to the types of data;
storing the data input from the external apparatus in another memory area of the memory irrespective of the type of the data, when it is confirmed that the data input from the external apparatus does not accompany the write-in command.

6. A computer-readable storage medium having a communication information processing program stored thereon that is executable by a computer to cause the computer to perform a process comprising:
assigning, to input data, first identification information for identifying the input data, and storing the input data in a predetermined memory;
removing an extension, representing a type of data, which is included in second identification information which is previously assigned to data stored in the memory and can be managed by a user;
generating management information representing a relationship between the first identification information assigned to the data and the second identification information with the extension removed therefrom, and storing the management information in the memory; and
receiving data from an external apparatus, wherein the second identification information is assigned to the data by the external apparatus, and the extension removed from the second identification information is for data management in the external apparatus.

* * * * *